United States Patent
Wang et al.

(10) Patent No.: US 11,246,152 B2
(45) Date of Patent: Feb. 8, 2022

(54) DATA TRANSMISSION METHOD AND APPARATUS

(71) Applicant: HUAWEI TECHNOLOGIES CO., LTD., Guangdong (CN)

(72) Inventors: Aiying Wang, Shenzhen (CN); Lang He, Dongguan (CN); Lei Ning, Shenzhen (CN); Longji Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/884,441

(22) Filed: May 27, 2020

(65) Prior Publication Data

US 2020/0288489 A1 Sep. 10, 2020

Related U.S. Application Data

(63) Continuation of application No. PCT/CN2017/113171, filed on Nov. 27, 2017.

(51) Int. Cl.
*H04W 68/02* (2009.01)
*H04W 72/12* (2009.01)

(52) U.S. Cl.
CPC ... *H04W 72/1268* (2013.01); *H04W 72/1252* (2013.01)

(58) Field of Classification Search
CPC ......... H04W 72/1252; H04W 72/1268; H04W 68/02; H04W 72/04; H04W 72/12
(Continued)

(56) References Cited

U.S. PATENT DOCUMENTS

| 2014/0056198 A1* | 2/2014 | Quan ............... H04W 52/0216 370/311 |
| 2016/0128095 A1* | 5/2016 | Damnjanovic ....... H04L 5/0092 370/336 |

(Continued)

FOREIGN PATENT DOCUMENTS

| CN | 102761942 A | 10/2012 |
| CN | 102833857 A | 12/2012 |

(Continued)

OTHER PUBLICATIONS

3GPP TS 36.211 v13.7.1 (Sep. 2017), "3rd Generation Partnership Project; Technical Specification Group Radio Access Network; Evolved Universal Terrestrial Radio Access (E-UTRA); Physical channels and modulation," Sep. 2017, 172 pages.

(Continued)

*Primary Examiner* — Nathan S Taylor
(74) *Attorney, Agent, or Firm* — Fish & Richardson P.C.

(57) ABSTRACT

One example method includes obtaining, by an access network device, a waiting duration corresponding to transmitting uplink data of a first subframe quantity by a terminal, where the first subframe quantity is a subframe quantity with the greatest scheduling efficiency within a preset subframe quantity value range when the access network device schedules the terminal to transmit the uplink data. In response to determining that the waiting duration is greater than a threshold, the access network device can then determine a second subframe quantity that is within the preset subframe quantity value range and that enables the waiting duration to be less than or equal to the threshold. The access network device can then send a first uplink authorization instruction to the terminal, where the first uplink authorization instruction is used to instruct the terminal to send uplink data of the second subframe quantity.

12 Claims, 5 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2017/0111164 | A1* | 4/2017 | Wyville | H04B 1/525 |
| 2017/0208615 | A1* | 7/2017 | Zhang | H04L 5/0094 |
| 2017/0231006 | A1* | 8/2017 | Yin | H04W 72/0446 |
| 2018/0352582 | A1* | 12/2018 | Yi | H04W 72/1257 |

FOREIGN PATENT DOCUMENTS

| | | |
|---|---|---|
| CN | 105451345 A | 3/2016 |
| CN | 106102180 A | 11/2016 |
| CN | 107113831 A | 8/2017 |
| EP | 2693833 A1 | 2/2014 |
| WO | 2017078465 A1 | 5/2017 |
| WO | 2017136759 A1 | 8/2017 |

OTHER PUBLICATIONS

3GPP TS 36.212 v14.4.0 (Sep. 2017), "3rd Generation Partnership Project Technical Specification Group Radio Access Network; Evolved Universal Terrestrial Radio Access (E-UTRA); Multiplexing and channel coding," Sep. 2017, 85 pages.

3GPP TS 36.213 V12.12.0 (Sep. 2017), "3rd Generation Partnership Project; Technical Specification Group Radio Access Network; Evolved Universal Terrestrial Radio Access (E-UTRA); Physical layer procedures," Sep. 2017, 241 pages.

3GPP TS 36.331 v12.15.1 (Sep. 2017), "3rd Generation Partnership Project; Technical Specification Group Radio Access Network; Evolved Universal Terrestrial Radio Access (E-UTRA); Radio Resource Control (RRC) Protocol specification," Sep. 2017, 144 pages.

3GPP TS 36.321 v1440 (Sep. 2017), "3rd Generation Partnership Project; Technical Specification Group Radio Access Network; Evolved Universal Terrestrial Radio Access (E-UTRA); Medium Access Control (MAC) protocol specification," Sep. 2017, 108 pages.

PCT International Search Report and Written Opinion issued in International Application No. PCT/CN2017/113171 dated Aug. 13, 2018, 18 pages (with English translation).

3GPP TS 36.321 V14.1.0 (Sep. 2017), "3rd Generation Partnership Project; Technical Specification Group Radio Access Network; Evolved Universal Terrestrial Radio Acces (E-UTRA); Medium Access Control (MAC) protocol specification (Release 14)," XP051354073, Sep. 26, 2017, 108 pages.

Extended European Search Report issued in European Application No. 17932652.5 dated Sep. 18, 2020, 12 pages.

Farrell et al., "LPWAN Overview; draft-ietf-lpwan-overview-07," Internet Engineering Task Force Internet Draft, XP015122076, Oct. 2017, 42 pages.

Office Action issued in Chinese Application No. 201780097159.1 dated Dec. 10, 2020, 5 pages.

* cited by examiner

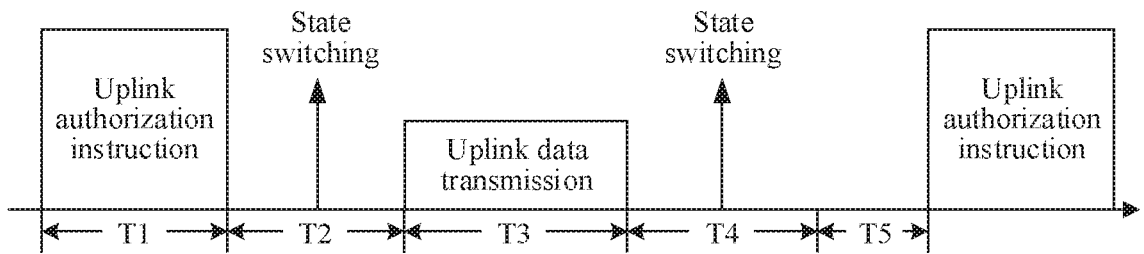

FIG. 1

```
┌─────────────────────────────────────────────┐
│ If an access network device determines that │
│ waiting duration corresponding to           │
│ transmitting uplink data of a first         │
│ subframe quantity by a terminal is greater  │
│ than a threshold, the access network device │── 201
│ determines first indication information     │
│ when determining that waiting duration      │
│ corresponding to transmitting uplink data   │
│ of a second subframe quantity by the        │
│ terminal is less than or equal to the       │
│ threshold; and the first indication         │
│ information indicates the second subframe   │
│ quantity                                    │
└─────────────────────────────────────────────┘
                      ▼
┌─────────────────────────────────────────────┐
│ The access network device sends a second    │
│ uplink authorization instruction that       │── 202
│ includes the first indication information   │
│ to the terminal                             │
└─────────────────────────────────────────────┘
                      ▼
┌─────────────────────────────────────────────┐
│ The terminal receives the second uplink     │
│ authorization instruction that includes the │
│ first indication information from the       │
│ access network device, where the first      │── 203
│ indication information indicates the second │
│ subframe quantity; and the waiting duration │
│ corresponding to transmitting the uplink    │
│ data of the second subframe quantity by the │
│ terminal is less than or equal to the       │
│ threshold                                   │
└─────────────────────────────────────────────┘
                      ▼
┌─────────────────────────────────────────────┐
│ The terminal transmits the uplink data of   │── 204
│ the second subframe quantity                │
└─────────────────────────────────────────────┘
```

FIG. 2

DATA TRANSMISSION METHOD AND APPARATUS

CROSS-REFERENCE TO RELATED APPLICATIONS

This application is a continuation of International Application No. PCT/CN2017/113171, filed on Nov. 27, 2017, the disclosure of which is hereby incorporated by reference in its entirety.

TECHNICAL FIELD

This application relates to the field of wireless communications technologies, and in particular, to a data transmission method and an apparatus.

BACKGROUND

A low power wide area network (LPWAN) is targeted for meeting requirements for long distance and low power communication in the internet of things, the communication has features such as a long transmission distance, many connection nodes, low power consumption of a terminal, and low operation and maintenance costs. A cellular internet of things (CIoT), as one of LPWAN technologies, is a half-duplex cellular communications system introduced in R13 by the 3rd generation partnership project (3GPP), which is an international standards organization, and is deployed and operated under a licensed spectrum by an operator.

Before transmitting uplink data, a terminal first sends a buffer status report (BSR) to a base station, and the BSR indicates a volume of data that the terminal needs to transmit. The base station schedules, based on the BSR, an uplink resource for the terminal. The base station indicates the uplink resource and a state switching time of the terminal to the terminal by using an uplink authorization instruction (where the CIoT is a half-duplex cellular communications system, and therefore, before the terminal receives or sends data, the terminal needs to switch from a listening state to a data transmission state; and correspondingly, after the terminal finishes receiving or sending the data, the terminal needs to switch from the data transmission state to the listening state). Therefore, to send the uplink data, the terminal needs to perform the following process: receiving the uplink authorization instruction, switching from the listening state to the data transmission state, transmitting the uplink data, switching from the data transmission state to the listening state, and listening to the uplink authorization instruction (used to obtain an uplink resource of data transmitted next time). In the foregoing process, the terminal can transmit the uplink data only if the terminal detects the uplink authorization instruction. The uplink authorization instruction is periodically sent, and therefore, if the base station sends a next uplink authorization instruction a relatively long time after the terminal switches to the listening state, the terminal can merely remain in the listening state during the time. Consequently, the uplink resource cannot be effectively used, and an uplink data transmission rate of the terminal is reduced.

SUMMARY

An objective of the implementations of this application is to provide a data transmission method and an apparatus, to increase an uplink data transmission rate of a terminal.

An embodiment of this application provides a data transmission method, including:

obtaining, by an access network device, waiting duration corresponding to transmitting uplink data of a first subframe quantity by a terminal, where the first subframe quantity is a subframe quantity with greatest scheduling efficiency within a preset subframe quantity value range when the access network device schedules the terminal to transmit the uplink data, and the waiting duration is duration that exists after the terminal transmits the uplink data and that is from a time at which the terminal switches to a listening state to a time at which the terminal detects an uplink authorization instruction;

if the waiting duration corresponding to transmitting the uplink data of the first subframe quantity by the terminal is greater than a threshold, determining, by the access network device within the preset subframe quantity value range, a second subframe quantity that enables the waiting duration corresponding to transmitting the uplink data by the terminal to be less than or equal to the threshold; and sending, by the access network device, a first uplink authorization instruction to the terminal, where the first uplink authorization instruction is used to instruct the terminal to send uplink data of the second subframe quantity.

By using the foregoing method, when the access network device schedules the terminal to transmit the uplink data, and determines that the waiting duration corresponding to transmitting the uplink data of the first subframe quantity by the terminal with greatest scheduling efficiency is greater than the threshold, the access network device again selects, within the preset subframe quantity value range, a subframe quantity of the uplink data to be transmitted for the terminal, so that the waiting duration corresponding to transmitting the uplink data by the terminal is less than or equal to the threshold. Therefore, the waiting duration of the terminal is reduced after the terminal transmits the uplink data, and the uplink data transmission rate of the terminal is increased.

Optionally, the method further includes:

if the waiting duration corresponding to transmitting the uplink data of the first subframe quantity by the terminal is less than or equal to the threshold, sending, by the access network device, a second uplink authorization instruction to the terminal, where the second uplink authorization instruction is used to instruct the terminal to send the uplink data of the first subframe quantity.

Optionally, the method further includes:

if the second subframe quantity that enables the waiting duration corresponding to transmitting the uplink data by the terminal to be less than or equal to the threshold does not exist within the preset subframe quantity value range, sending, by the access network device, a second uplink authorization instruction to the terminal, where the second uplink authorization instruction is used to instruct the terminal to send the uplink data of the first subframe quantity.

Optionally, the determining, by the access network device within the preset subframe quantity value range, a second subframe quantity that enables the waiting duration corresponding to transmitting the uplink data by the terminal to be less than or equal to the threshold includes:

for any subframe quantity within the preset subframe quantity value range, if the access network device determines that the waiting duration corresponding to transmitting the uplink data of the subframe quantity by the terminal is less than or equal to the threshold, determining the subframe quantity as the second subframe quantity.

Optionally, the threshold is 0.

An embodiment of this application provides a data transmission method, including:

receiving, by a terminal, a first uplink authorization instruction from an access network device, where the first uplink authorization instruction is used to instruct the terminal to send uplink data of a second subframe quantity; and the second subframe quantity is a subframe quantity that enables the waiting duration corresponding to transmitting the uplink data by the terminal to be less than or equal to a threshold and that is determined within a preset subframe quantity value range by the access network device when waiting duration corresponding to transmitting uplink data of a first subframe quantity by the terminal is greater than the threshold; and sending, by the terminal, uplink data of the second subframe quantity.

In the foregoing method, the second subframe quantity can enable the waiting duration corresponding to transmitting the uplink data by the terminal is less than or equal to the threshold, and therefore, the waiting duration of the terminal is reduced after the terminal transmits the uplink data, and an uplink data transmission rate of the terminal is increased.

Optionally, the threshold is 0.

An embodiment of this application provides a communications apparatus, including:

a processing unit, configured to obtain waiting duration corresponding to transmitting uplink data of a first subframe quantity by a terminal, where the first subframe quantity is a subframe quantity with greatest scheduling efficiency within a preset subframe quantity value range when the terminal is scheduled to transmit the uplink data, and the waiting duration is duration that exists after the terminal transmits the uplink data and that is from a time at which the terminal switches to a listening state to a time at which the terminal detects an uplink authorization instruction;

the processing unit, configured to determine, when the waiting duration corresponding to transmitting the uplink data of the first subframe quantity by the terminal is greater than a threshold, a second subframe quantity that is within the preset subframe quantity value range and that enables the waiting duration corresponding to transmitting the uplink data by the terminal to be less than or equal to the threshold; and a transceiver unit, configured to send a first uplink authorization instruction to the terminal, where the first uplink authorization instruction is used to instruct the terminal to send uplink data of the second subframe quantity.

Optionally, the transceiver unit is further configured to:

if the waiting duration corresponding to transmitting the uplink data of the first subframe quantity by the terminal is less than or equal to the threshold, send a second uplink authorization instruction to the terminal, where the second uplink authorization instruction is used to instruct the terminal to send the uplink data of the first subframe quantity.

Optionally, the transceiver unit is further configured to:

if the second subframe quantity that enables the waiting duration corresponding to transmitting the uplink data by the terminal to be less than or equal to the threshold does not exist within the preset subframe quantity value range, send a second uplink authorization instruction to the terminal, where the second uplink authorization instruction is used to instruct the terminal to send the uplink data of the first subframe quantity.

Optionally, the processing unit is specifically configured to:

for any subframe quantity within the preset subframe quantity value range, if it is determined that the waiting duration corresponding to transmitting the uplink data of the subframe quantity by the terminal is less than or equal to the threshold, determine the subframe quantity as the second subframe quantity.

Optionally, the threshold is 0.

An embodiment of this application provides a communications apparatus, including:

a receiving unit, configured to receive a first uplink authorization instruction from an access network device, where the first uplink authorization instruction is used to instruct the terminal to send uplink data of a second subframe quantity; and the second subframe quantity is a subframe quantity that enables the waiting duration corresponding to transmitting the uplink data by the terminal to be less than or equal to a threshold and that is determined within a preset subframe quantity value range by the access network device when waiting duration corresponding to transmitting uplink data of a first subframe quantity by the terminal is greater than the threshold; and a sending unit, configured to send uplink data of the second subframe quantity.

Optionally, the threshold is 0.

An embodiment of this application provides a computer-readable storage medium. The computer storage medium stores a computer-readable instruction. When a computer reads and executes the computer-readable instruction, the communications apparatus is enabled to perform the method according to any one of the foregoing possible designs.

An embodiment of this application provides a computer program product. When a computer reads and executes the computer program product, the communications apparatus is enabled to perform the method according to any one of the foregoing possible designs.

An embodiment of this application provides a chip. The chip is connected to a memory, and is configured to read and execute a software program stored in the memory, to implement the method according to any one of the foregoing possible designs.

BRIEF DESCRIPTION OF DRAWINGS

FIG. 1 is a schematic diagram of a data transmission time sequence according to an embodiment of this application;

FIG. 2 is a schematic flowchart of a data transmission method according to an embodiment of this application;

DESCRIPTION OF EMBODIMENTS

Figure 3:
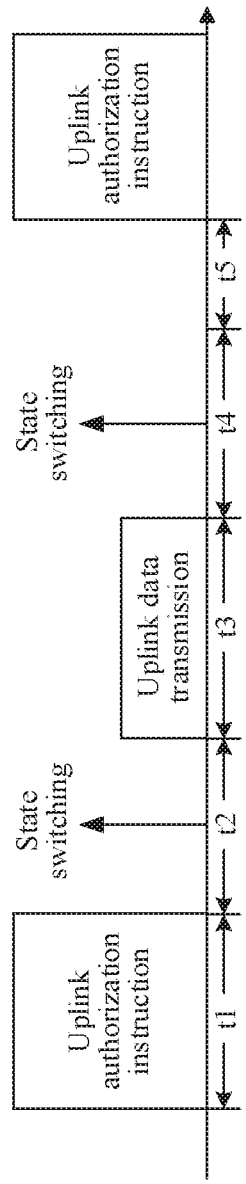
FIG. 3 is a schematic diagram of a data transmission time sequence according to an embodiment of this application.

The following further describes in detail the embodiments of this application with reference to accompanying drawings.

In the embodiments of this application, a terminal, also referred to as user equipment (UE), may support CioT technologies, and has a wireless connection function or the like. In the embodiments of this application, the terminal may refer to: a mobile phone, a tablet computer, a smart meter, a palmtop computer, a mobile Internet device (MID), and a wearable device such as a smartwatch, a smart band, or a pedometer.

An access network device may be a gNB (next generation Node B) in a 5G system, and may be a base station (Base Transceiver Station, BTS) in a global system of mobile communication (GSM) system or in code division multiple access (CDMA), a base station (NodeB, NB) in a wideband code division multiple access (WCDMA) system, an evolved base station (Evolved Node B, eNB or eNodeB) in a long term evolution (LTE) system, or the like.

Currently, an uplink data transmission process performed by a terminal in a cellular internet of things may be divided into 5 pieces of time duration. As shown in FIG. 1 for details, the 5 pieces of duration are: duration T1 in which an uplink authorization instruction is received, duration T2 in which the terminal switches from a listening state to a data transmission state, duration T3 in which uplink data is transmitted, duration T4 in which the terminal switches from the data transmission state to the listening state, and duration T5 in which the uplink authorization instruction of the uplink data transmission is detected next time. Values of T1, T2, and T4 are specified by a cellular internet of things protocol, and usually are fixed values; and a value of T3 is related to a volume of transmitted data. The uplink authorization instruction is periodically sent, and therefore, a minimum value of T5 is 0, and a maximum value of T5 is a sending cycle of the uplink authorization instruction.

In the embodiments of this application, an uplink data transmission rate of the terminal is a ratio of a bit quantity D of bits that are included in the uplink data sent by the terminal to a time required for the uplink data transmission, that is, an uplink data transmission rate S meets the following formula:

$$S = D/T1 + T2 + T3 + T4 + T5) \quad (1)$$

In the embodiments of this application, a data transmission method is provided, to reduce, as much as possible, duration from a time at which the terminal switches to the listening state after transmitting the uplink data to a time at which the uplink authorization instruction is detected, that is, T5. Therefore, channel utilization is improved, and a relatively high uplink data transmission rate is obtained, which are described as following in detail.

FIG. 2 is a schematic flowchart of a data transmission method according to an embodiment of this application. As shown in FIG. 2, the method includes the following steps.

Step 201: An access network device obtains waiting duration corresponding to transmitting uplink data of a first subframe quantity by the terminal.

The first subframe quantity is a subframe quantity with greatest scheduling efficiency within a preset subframe quantity value range when the access network device schedules the terminal to transmit the uplink data, and the waiting duration is duration that exists after the terminal transmits the uplink data and that is from a time at which the terminal switches to a listening state to a time at which the terminal detects an uplink authorization instruction.

In this embodiment of this application, the preset subframe quantity value range is a subframe quantity value range of subframes that can be transmitted by the terminal once. The preset subframe quantity value range may be a value range specified in a protocol. In an existing protocol, to prevent the terminal from occupying a channel for a long time, the subframe quantity of maximum subframes that can be transmitted by the terminal once is specified, and a maximum value in the preset subframe quantity value range is the subframe quantity of the maximum subframes that can be transmitted by the terminal once. When the preset subframe quantity value range is different, and the terminal sends the uplink data, a value of the subframe quantity with greatest scheduling efficiency is different, and may be specifically determined based on an actual condition. Details are not described herein. The subframe quantity with the greatest scheduling efficiency represents a quantity of subframes corresponding to the uplink data sent by the terminal when the scheduling efficiency is greatest.

For example, when the preset subframe quantity value range is 1 to 6, the subframe quantity with the greatest scheduling efficiency may be 5, that is, the scheduling efficiency may be greatest when the terminal sends uplink data of 5 subframes; and when the preset subframe quantity value range 1 to 10, the first subframe quantity may be 8, that is, the scheduling efficiency is greatest when the terminal sends uplink data of 8 subframes. Certainly, the foregoing merely describes an example, and the preset subframe quantity value range and the first subframe quantity may be other values. Details are not described herein again.

Step 202: if the waiting duration corresponding to transmitting the uplink data of the first subframe quantity by the terminal is greater than a threshold, the access network device determines, within the preset subframe quantity value range, a second subframe quantity that enables the waiting duration corresponding to transmitting the uplink data by the terminal to be less than or equal to the threshold.

Correspondingly, if the waiting duration corresponding to transmitting the uplink data of the first subframe quantity by the terminal is less than or equal to the threshold, the access network device sends a second uplink authorization instruction to the terminal, where the second uplink authorization instruction is used to instruct the terminal to send the uplink data of the first subframe quantity.

Step 203: The access network device sends a first uplink authorization instruction to the terminal, where the first uplink authorization instruction is used to instruct the terminal to send uplink data of the second subframe quantity.

In this embodiment of this application, the uplink authorization instruction may refer to downlink control information (DCI) or the like.

Step 204: The terminal receives the first uplink authorization instruction from the access network device, and sends the uplink data of the second subframe quantity.

In step 201, after determining a data volume of the uplink data that the terminal needs to transmit, the access network device may schedule an uplink resource for the terminal. It should be noted that due to limitation of the protocol, a volume of data that can be borne in the uplink resource scheduled by the access network device for each time is limited. For example, the terminal can merely transmit data of 6 or 10 subframes once at a maximum. Therefore, the access network device may need to schedule the uplink resource for the terminal for a plurality of times, so that the terminal can finish transmitting the uplink data required for the transmission.

In this embodiment of this application, before scheduling the uplink resource, the access network device first determines, based on the preset subframe quantity value range, the subframe quantity of the uplink data that is transmitted by the terminal in the uplink resource, and then schedules the corresponding uplink resource for the terminal based on the determined subframe quantity.

If the access network device determines that the data volume of the uplink data that the terminal needs to transmit is greater than a volume of data that is borne in a maximum subframe quantity within the preset subframe quantity value range, the access network device may first determine whether the waiting duration corresponding to transmitting the uplink data of the subframe quantity with greatest scheduling efficiency (namely, the first subframe quantity) by the terminal is less than or equal to the threshold. The threshold may be greater than or equal to 0, and less than or equal to a sending cycle of the uplink authorization instruction. For example, the threshold may be 0.

It should be noted that with reference to FIG. 3, in this embodiment of this application, the waiting duration $t_5$ may be determined by using the following formula:

$$t_5 = t_x - (t_1 + t_2 + t_3 + t_4) \tag{2}$$

$t_1$ is transmitting duration of the uplink authorization instruction received before the terminal transmits the uplink data, and the terminal determines, by using the uplink authorization instruction, the subframe quantity required for the transmission. $t_2$ is duration in which the terminal switches from the listening state to the data transmission state. $t_3$ is duration in which the terminal transmits the uplink data, where the duration may be determined based on an uplink subframe quantity indicated in the uplink authorization instruction received from $t_1$. $t_4$ is duration in which the terminal switches from the data transmission state to the listening state. $t_x$ is duration from a starting time of $t_1$ to a starting time of the first uplink authorization instruction received after the terminal switches to the listening state.

In the formula (2), $t_1$, $t_2$, and $t_4$ may all be considered as fixed values, a value of $t_3$ is determined based on the subframe quantity that is of subframes transmitted by the terminal and that is determined by the access network device. The uplink authorization instruction is sent periodically, and therefore, if an accumulated value of $t_1$, $t_2$, $t_3$, and $t_4$ is exactly an integer multiple of the sending cycle of the uplink authorization instruction, the waiting duration may be 0. In this case, after finishing transmitting the uplink data in $t_3$, the terminal directly obtains a next uplink authorization instruction without waiting, to transmit data based on the entire next uplink authorization instruction, so that channel resource utilization is improved, and a data transmission rate of the terminal is improved. If the accumulated value of $t_1$, $t_2$, $t_3$, and $t_4$ is not an integer multiple of the sending cycle of the uplink authorization instruction, a value of the waiting duration after the uplink data has been transmitted in t3 is not 0. In this case, the terminal needs to wait for a time period to obtain the next uplink authorization instruction, and consequently uplink data transmission efficiency is reduced.

For example, $t_1$ is 1 ms; $t_2$ is 8 ms; duration of each subframe is 8 ms; $t_4$ is 3 ms; and $t_x$ that is from the starting time of $t_1$ to the starting time of the first uplink authorization instruction received after the terminal switches to the listening state is 64 ms. When the access network device determines that the subframe quantity of the uplink data transmitted by the terminal is 5, $t_3$ is 40 ms, and correspondingly, $t_5$ is 13 ms. To improve the transmission efficiency, the access network device may determine, as 6, the subframe quantity of the uplink data that is transmitted by the terminal. In this case, $t_3$ is 48 ms, and correspondingly, $t_5$ is 5 ms, so that, a waiting time of the terminal is reduced, and the data volume of the uplink data that is transmitted by the terminal is increased.

It should be noted that with reference to FIG. 3, in this embodiment of this application, scheduling efficiency S may be determined based on the following formula:

$$S = d/(t_1 + t_2 + t_3 + t_4) \tag{3}$$

d is a bit quantity of bits that are included in the uplink data sent by the terminal in $t_3$.

The subframe quantity of the uplink data that is transmitted by the terminal is not proportional to the bit quantity of bits that are included in the uplink data. Therefore, scheduling efficiency corresponding to a maximum subframe quantity within the preset subframe quantity value range may not be greatest. For example, $t_1$ is 1 ms; $t_2$ is 8 ms; the duration of each subframe is 8 ms; and $t_4$ is 3 ms. A data volume that is of the uplink data and that corresponds to 5 subframes is 872 bits, and a data volume that is of the uplink data and that corresponds to 6 subframes is 1000 bits. It may be determined based on the formula (3) that when the terminal transmits the uplink data of 5 subframes, the scheduling efficiency is 16.77, and when the terminal transmits the uplink data of 6 subframes, the scheduling efficiency is 16.66, that is, when the terminal transmits the uplink data of 5 subframes, the scheduling efficiency is greatest. It should be noted that when the subframe quantity is determined, the data volume corresponding to the subframe quantity may also be determined. Therefore, scheduling efficiency corresponding to different subframe quantities may directly be determined based on the formula (3).

In step 202, if determining that the waiting duration corresponding to transmitting the uplink data of the subframe quantity with the greatest scheduling efficiency by the terminal is greater than the threshold, the access network device may traverse the subframe quantity within the preset subframe quantity value range, and determines the subframe quantity that enables the waiting duration corresponding to transmitting the uplink data by the terminal to be less than or equal to the threshold. Specifically, for any subframe quantity within the preset subframe quantity value range, if determining that the waiting duration corresponding to transmitting the uplink data of the subframe quantity by the terminal is less than or equal to the threshold, the access network device determines the subframe quantity as the second subframe quantity.

It should be noted that if the waiting duration of the terminal can be enabled to be less than or equal to the threshold by determining a plurality of subframe quantities, a subframe quantity may be randomly selected as the second subframe quantity, or a corresponding subframe quantity when waiting duration of the terminal is enabled to be at a minimum may be determined as the second subframe quantity.

Finally, in step 203, the access network device sends a first uplink authorization instruction to the terminal, where the first uplink authorization instruction is used to instruct the terminal to send the uplink data of the second subframe quantity. It should be noted that the first uplink authorization instruction may directly include the second subframe quantity, or may include an index value of the second subframe quantity. This is not limited in this embodiment of this application.

In this embodiment of this application, the first uplink authorization instruction may further include information such as first duration indication information, second duration indication information, and resource indication information, which are not described herein by using examples one by one. The first duration indication information is used to indicate the duration in which the terminal switches from the listening state to the data transmission state after the terminal receives the first uplink authorization instruction, that is, the first duration indication information is used to indicate the duration of $t_2$; the second duration indication information is used to indicate the duration in which the terminal switches from the data transmission state to the listening state, that is, the second duration indication information is used to indicate the duration of $t_4$; and the resource indication information indicates an uplink resource that is scheduled for the terminal.

If the access network device determines that the waiting duration corresponding to transmitting any subframe quantity within the preset subframe quantity value range by the terminal is greater than the threshold, that is, the second subframe quantity that enables the waiting duration corresponding to transmitting the uplink data by the terminal to be less than or equal to the threshold does not exist within the preset subframe quantity value range, the access network device determines the subframe quantity with the greatest scheduling efficiency as the subframe quantity of the uplink data that is transmitted by the terminal. In this case, the access network device sends the second uplink authorization instruction to the terminal, where the second uplink authorization instruction is used to instruct the terminal to send the uplink data of the first subframe quantity.

With reference to the foregoing descriptions, in a narrowband internet of things (NB-IoT) system, and in a scenario of a single process hybrid automatic repeat request (Harq) and a common transport block size (TBS), the preset subframe quantity value range is 1 to 6, and in the preset subframe quantity value range, the subframe quantity with the greatest scheduling efficiency is 5. In this scenario, and in a possible implementation, the access network device may perform the following steps.

Step 1: The access network device determines whether the waiting duration corresponding to transmitting the uplink data of 5 subframes by the terminal is less than or equal to the threshold. If the access network device determines that the waiting duration corresponding to transmitting the uplink data of 5 subframes by the terminal is less than or equal to the threshold, it may be determined that the subframe quantity of the uplink data that is transmitted by the terminal is 5, otherwise, the access network device jumps to step 2.

Step 2: If the access network device determines that the waiting duration corresponding to transmitting the uplink data of 5 subframes by the terminal is greater than the threshold, the access network device determines, within the preset subframe quantity value range, an unmarked subframe quantity with the greatest scheduling efficiency as a to-be-determined subframe quantity.

Step 3: If the access network device determines that the waiting duration corresponding to transmitting uplink data of the to-be-determined subframe quantity by the terminal is less than or equal to the threshold, the access network device finishes the entire process, and determines the to-be-determined subframe quantity as the second subframe quantity of the uplink data that is transmitted by the terminal, otherwise, the access network device jumps to step 4.

Step 4: If the access network device determines that the waiting duration corresponding to transmitting the uplink data of the to-be-determined subframe quantity by the terminal is greater than the threshold, the access network device marks the to-be-determined subframe quantity, and determines whether all subframe quantities within the preset subframe quantity value range have been marked, if all subframe quantities have been marked, it is determined that within the preset subframe quantity value range, the subframe quantity that enables the waiting duration corresponding to transmitting the uplink data by the terminal to be less than or equal to the threshold does not exist, and the access network device jumps to step 6, otherwise, the access network device jumps to step 5.

Step 5: The access network device determines that all the subframe quantities within the preset subframe quantity value range has not been marked, re-selects an unmarked subframe quantity as the to-be-determined subframe quantity, and jumps to step 3.

Step 6: If the access network device determines that within the preset subframe quantity value range, the subframe quantity that enables the waiting duration corresponding to transmitting the uplink data by the terminal to be less than or equal to the threshold does not exist, the access network device may determine the subframe quantity with the greatest scheduling efficiency within the preset subframe quantity value range as the subframe quantity of the uplink data that is transmitted by the terminal, that is, the subframe quantity 5 is determined as the subframe quantity of the uplink data that is transmitted by the terminal.

In this scenario, and in another possible implementation, the access network device may perform the following steps.

Step 1: The access network device determines whether the waiting duration corresponding to transmitting the uplink data of 5 subframes by the terminal is less than or equal to the threshold. If the access network device determines that the waiting duration corresponding to 5 subframes is less than or equal to the threshold, it may be determined that the subframe quantity of the uplink data that is transmitted by the terminal is 5, otherwise, the access network device jumps to step 2.

Step 2: If the access network device determines that the waiting duration corresponding to transmitting the uplink data of 5 subframes by the terminal is greater than the threshold, the access network device determines whether the waiting duration corresponding to transmitting the uplink data of the subframe quantities within the preset subframe quantity value range, namely, 1, 2, 3, 4, and 6, by the terminal is less than or equal to the threshold. If the access network device determines that there is at least one subframe quantity, where the waiting duration corresponding to the subframe quantity is less than or equal to the threshold, the access network device jumps to step 3, otherwise, the access network device jumps to step 4.

Step 3: The access network device determines a subframe quantity among the at least one subframe quantity as the subframe quantity of the uplink data that is transmitted by the terminal.

Specifically, the access network device may randomly select a subframe quantity among the at least one subframe quantity as the subframe quantity of the uplink data that is transmitted by the terminal, or the access network device may determine the subframe quantity with the greatest scheduling efficiency among the at least one subframe quantity as the subframe quantity of the uplink data that is transmitted by the terminal, or the access network device determines the subframe quantity of the uplink data that is transmitted by the terminal among the at least one subframe quantity based on another method. This is not limited in this embodiment of this application.

Step 4: The access network device determines that within the preset subframe quantity value range, the subframe quantity that enables the waiting duration corresponding to transmitting the uplink data to be less than or equal to the threshold does not exist, and determines the subframe quantity with the greatest scheduling efficiency within the preset subframe quantity value range as the subframe quantity of the uplink data that is transmitted by the terminal, that is, the subframe quantity 5 is determined as the subframe quantity of the uplink data that is transmitted by the terminal.

In another scenario, that is, in a scenario of a double process Harq and an extended TBS in the NB-IoT system, the preset subframe quantity value range is 1 to 10, and in the preset subframe quantity value range, the subframe quantity with the greatest scheduling efficiency is 8. In this scenario, and in a possible implementation, the access network device may perform the following steps.

Step 1: The access network device determines whether the waiting duration corresponding to transmitting the uplink data of 8 subframes by the terminal is less than or equal to the threshold. If the access network device determines that the waiting duration corresponding to 8 subframes is less than or equal to the threshold, it may be determined that the subframe quantity of the uplink data that is transmitted by the terminal is 8, otherwise, the access network device jumps to step 2.

Step 2: If the access network device determines that the waiting duration corresponding to transmitting the uplink data of 8 subframes by the terminal is greater than the threshold, the access network device determines, within the preset subframe quantity value range, an unmarked subframe quantity with the greatest scheduling efficiency as a to-be-determined subframe quantity.

Step 3: If the access network device determines that the waiting duration for transmitting uplink data of the to-be-determined subframe quantity by the terminal is less than or equal to the threshold, the access network device finishes the entire process, and determines the to-be-determined subframe quantity as the subframe quantity of the uplink data that is transmitted by the terminal, otherwise, the access network device jumps to step 4.

Step 4: If the access network device determines that the waiting duration for transmitting the uplink data of the to-be-determined subframe quantity by the terminal is greater than the threshold, the access network device marks the to-be-determined subframe quantity, and determines whether all subframe quantities within the preset subframe quantity value range have been marked, if all subframe quantities have been marked, it is determined that within the preset subframe quantity value range, the subframe quantity that enables the waiting duration corresponding to transmitting the uplink data by the terminal to be less than or equal to the threshold does not exist, and the access network device jumps to step 6, otherwise, the access network device jumps to step 5.

Step 5: The access network device determines that all the subframe quantities within the preset subframe quantity value range has not been marked, re-selects an unmarked to-be-determined subframe quantity, and jumps to step 3.

Step 6: If the access network device determines that within the preset subframe quantity value range, the subframe quantity that enables the waiting duration corresponding to transmitting the uplink data by the terminal to be less than or equal to the threshold does not exist, the access network device may determine the subframe quantity with the greatest scheduling efficiency within the preset subframe quantity value range as the subframe quantity of the uplink data that is transmitted by the terminal, that is, the subframe quantity 8 is determined as the subframe quantity of the uplink data that is transmitted by the terminal.

Certainly, the foregoing merely describes an example, the access network device may further determine, by using other manners, the subframe quantity of the uplink data that is transmitted by the terminal. Details are not described herein again.

Optionally, in step 203, after determining that the subframe quantity of the uplink data that is transmitted by the terminal is the second subframe quantity, if determining that the uplink resource corresponding to transmitting the uplink data of the second subframe quantity by the terminal is not met, the access network device may not send the second uplink authorization instruction until it is determined that the second uplink authorization instruction is sent after there are enough uplink resources.

In step 204, after receiving the second uplink authorization instruction, the terminal may determine, after the terminal receives the first uplink authorization instruction, the duration in which the terminal switches from the listening state to the data transmission state, and information such as the subframe quantity of the uplink data that is transmitted by the terminal and the uplink resource scheduled by the access network device for the terminal.

Finally, the terminal transmits the uplink data of the second subframe quantity in the uplink resource scheduled by the access network device.

The following describes the foregoing process by using specific embodiments.

Figure 4:
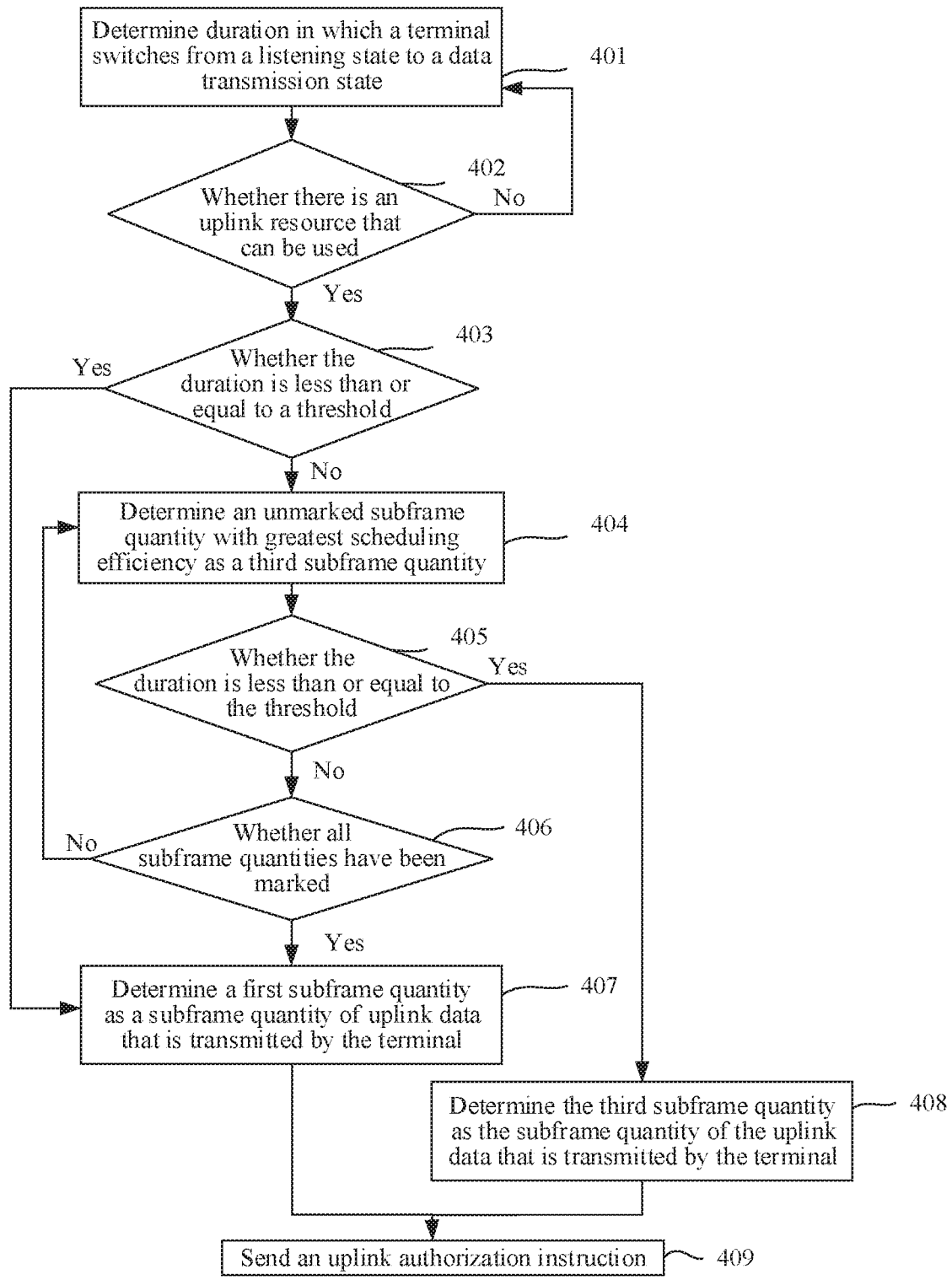
FIG. 4 is a schematic flowchart of a data transmission method according to an embodiment of this application.

FIG. 4 is a schematic flowchart of data scheduling according to an embodiment of this application.

Step 401: The access network device determines the duration $t_2$ in which the terminal switches from the listening state to the data transmission state and the duration $t_4$ in which the terminal switches from the data transmission state to the listening state.

Step 402: The access network device determines whether there is an uplink resource that can be used, and if there is an uplink resource that can be used, the access network device jumps to step 403, otherwise, the access network device jumps to step 401.

Step 403: The access network device determines whether the waiting duration corresponding to transmitting uplink data of the first subframe quantity by the terminal is less than or equal to the threshold. If the access network device determines that the waiting duration corresponding to transmitting the uplink data of the first subframe quantity by the terminal is less than or equal to the threshold, the access network device jumps to step 407, otherwise, the access network device jumps to step 404.

Step 404: The access network device determines, within the preset subframe quantity value range, the unmarked subframe quantity with the greatest scheduling efficiency as a third subframe quantity.

Step 405: The access network device determines whether the waiting duration corresponding to transmitting uplink data of the third subframe quantity by the terminal is less than or equal to the threshold, and if the waiting duration corresponding to transmitting uplink data of the third subframe quantity by the terminal is less than or equal to the threshold, the access network device jumps to step 408, otherwise, the access network device jumps to step 406.

Step 406: The access network device marks the third subframe quantity, and determines whether all subframe quantities within the preset subframe quantity value range have been marked, if all subframe quantities have been marked, it is determined that within the preset subframe quantity value range, the third subframe quantity that enables the waiting duration corresponding to transmitting the uplink data by the terminal to be less than or equal to the threshold does not exist, and the access network device jumps to step 407, otherwise, the access network device jumps to step 404.

Step 407: The access network device determines the first subframe quantity as the subframe quantity of the uplink data that is transmitted by the terminal, and jumps to step 409.

Step 408: The access network device determines the third subframe quantity as the subframe quantity of the uplink data that is transmitted by the terminal.

Step 409: The access network device sends the uplink authorization instruction to the terminal.

When the access network device determines, as the third subframe quantity, the subframe quantity of the uplink data that is transmitted by the terminal, the uplink authorization instruction is used to instruct the terminal to transmit the uplink data of the third subframe quantity; and when the access network device determines, as the first subframe quantity, the subframe quantity of the uplink data that is transmitted by the terminal, the uplink authorization instruction is used to instruct the terminal to transmit the uplink data of the first subframe quantity.

Figure 5:
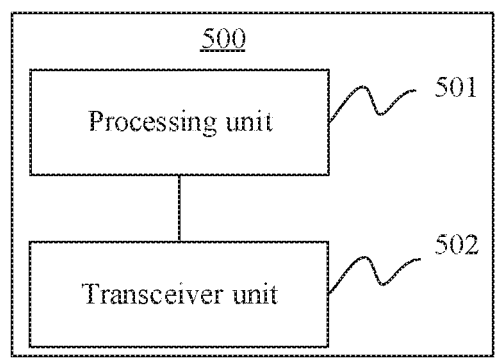
FIG. 5 is a schematic structural diagram of a communications apparatus according to an embodiment of this application.

FIG. 5 is a schematic structural diagram of a communications apparatus according to an embodiment of this application. The communications apparatus 500 may perform an action of the access network device in the flow shown in FIG. 2. The communications apparatus 500 includes a processing unit 501 and a transceiver unit 502.

The processing unit 501 is configured to obtain waiting duration corresponding to transmitting uplink data of a first subframe quantity by a terminal, where the first subframe quantity is a subframe quantity with greatest scheduling efficiency within a preset subframe quantity value range when the terminal is scheduled to transmit the uplink data, and the waiting duration is duration that exists after the terminal transmits the uplink data and that is from a time at which the terminal switches to a listening state to a time at which the terminal detects an uplink authorization instruction.

The processing unit 501 is configured to determine, when the waiting duration corresponding to transmitting the uplink data of the first subframe quantity by the terminal is greater than a threshold, a second subframe quantity that is within the preset subframe quantity value range and that enables the waiting duration corresponding to transmitting the uplink data by the terminal to be less than or equal to the threshold.

The transceiver unit 502 is configured to send a first uplink authorization instruction to the terminal, where the first uplink authorization instruction is used to instruct the terminal to send uplink data of the second subframe quantity.

Optionally, the transceiver unit 502 is further configured to:

if the waiting duration corresponding to transmitting the uplink data of the first subframe quantity by the terminal is less than or equal to the threshold, send a second uplink authorization instruction to the terminal, where the second uplink authorization instruction is used to instruct the terminal to send the uplink data of the first subframe quantity.

Optionally, the transceiver unit 502 is further configured to:

if the second subframe quantity that enables the waiting duration corresponding to transmitting the uplink data by the terminal to be less than or equal to the threshold does not exist within the preset subframe quantity value range, send the second uplink authorization instruction to the terminal, where the second uplink authorization instruction is used to instruct the terminal to send the uplink data of the first subframe quantity.

Optionally, the processing unit 501 is specifically configured to:

for any subframe quantity within the preset subframe quantity value range, if it is determined that the waiting duration corresponding to transmitting the uplink data of the subframe quantity by the terminal is less than or equal to the threshold, determine the subframe quantity as the second subframe quantity.

Optionally, the threshold is 0.

Figure 6:
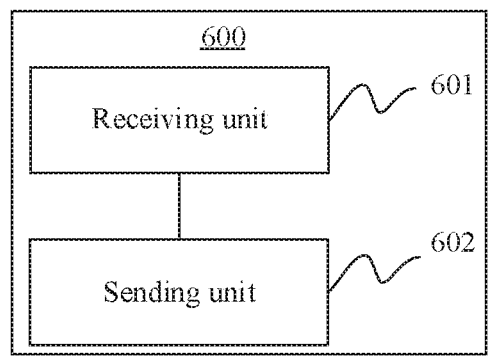
FIG. 6 is a schematic structural diagram of a communications apparatus according to an embodiment of this application.

FIG. 6 is a schematic structural diagram of a communications apparatus according to an embodiment of this application. The communications apparatus 600 may perform an action of the terminal in the flow shown in FIG. 2. The communications apparatus 600 includes a receiving unit 601 and a sending unit 602.

The receiving unit 601 is configured to receive a first uplink authorization instruction from an access network device, where the first uplink authorization instruction is used to instruct the terminal to send uplink data of a second subframe quantity; and the second subframe quantity is a subframe quantity that enables the waiting duration corresponding to transmitting the uplink data by the terminal to be less than or equal to a threshold and that is determined within a preset subframe quantity value range by the access network device when waiting duration corresponding to transmitting uplink data of a first subframe quantity by the terminal is greater than the threshold.

The sending unit 602 is configured to send uplink data of the second subframe quantity.

Optionally, the threshold is 0.

Figure 7:
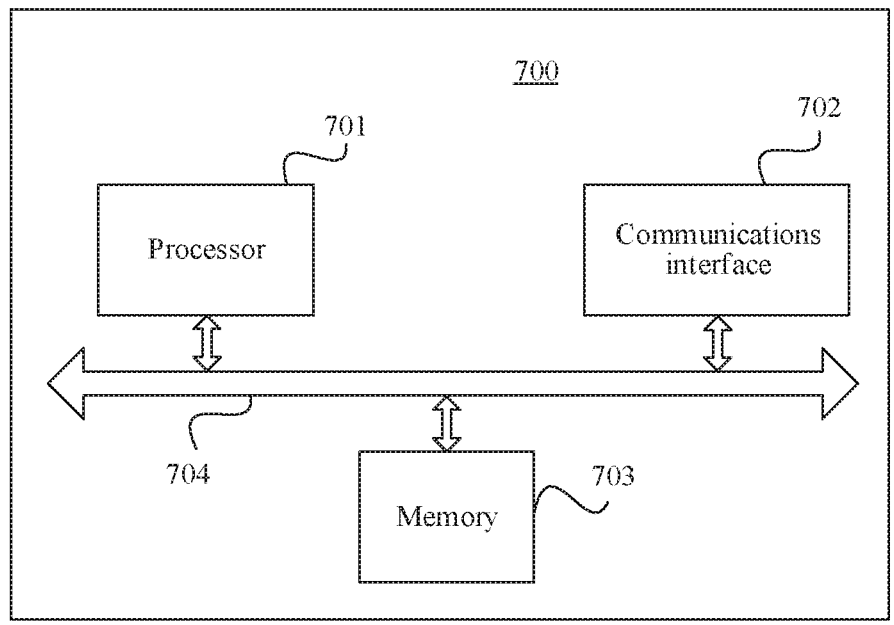
FIG. 7 is a schematic structural diagram of a communications apparatus according to an embodiment of this application.

FIG. 7 is a schematic structural diagram of a communications apparatus according to an embodiment of this application. The communications apparatus 700 may perform an action of the access network device in the flow shown in FIG. 2.

The communications apparatus 700 includes: a processor 701, a communications interface 702, and a memory 703. The processor 701, the communications interface 702, and the memory 703 are connected to each other by using a bus 704. Specific content of the foregoing module may refer to description of a related module in FIG. 11, and is not described herein again.

The communications interface 702 may be a wired communications interface, a wireless communications interface, or a combination thereof. The wired communications interface, for example, may be an Ethernet interface. The Ethernet interface may be an optical interface, an electrical interface, or a combination thereof. The wireless communications interface may be a wireless local area network interface.

The processor 701 is configured to obtain waiting duration corresponding to transmitting uplink data of a first subframe quantity by a terminal, where the first subframe quantity is a subframe quantity with greatest scheduling efficiency within a preset subframe quantity value range when the terminal is scheduled to transmit the uplink data, and the waiting duration is duration that exists after the terminal transmits the uplink data and that is from a time at which the terminal switches to a listening state to a time at which the terminal detects an uplink authorization instruction.

The processor 701 is configured to determine, when the waiting duration corresponding to transmitting the uplink data of the first subframe quantity by the terminal is greater than a threshold, a second subframe quantity that is within the preset subframe quantity value range and that enables the waiting duration corresponding to transmitting the uplink data by the terminal to be less than or equal to the threshold.

The communications interface 702 is configured to send a first uplink authorization instruction to the terminal, where the first uplink authorization instruction is used to instruct the terminal to send uplink data of the second subframe quantity.

Optionally, the communications interface 702 is further configured to:

if the waiting duration corresponding to transmitting the uplink data of the first subframe quantity by the terminal is less than or equal to the threshold, send a second uplink authorization instruction to the terminal, where the second uplink authorization instruction is used to instruct the terminal to send the uplink data of the first subframe quantity.

Optionally, the communications interface 702 is further configured to:

if the second subframe quantity that enables the waiting duration corresponding to transmitting the uplink data by the terminal to be less than or equal to the threshold does not exist within the preset subframe quantity value range, send the second uplink authorization instruction to the terminal, where the second uplink authorization instruction is used to instruct the terminal to send the uplink data of the first subframe quantity.

Optionally, the processor 701 is specifically configured to:

for any subframe quantity within the preset subframe quantity value range, if it is determined that the waiting duration corresponding to transmitting the uplink data of the subframe quantity by the terminal is less than or equal to the threshold, determine the subframe quantity as the second subframe quantity.

Optionally, the threshold is 0.

Figure 8:
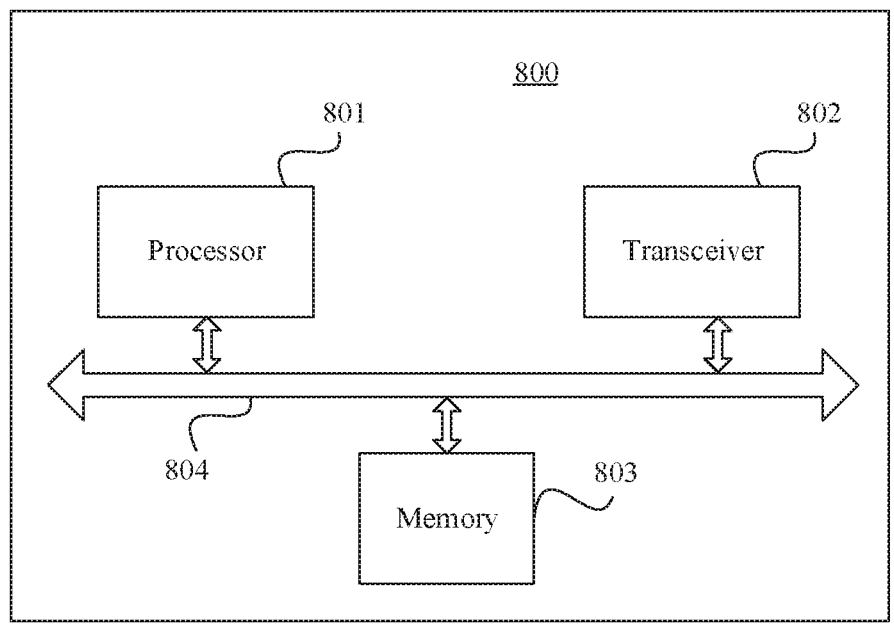
FIG. 8 is a schematic structural diagram of a communications apparatus according to an embodiment of this application.

FIG. 8 is a schematic structural diagram of a communications apparatus according to an embodiment of this application. The communications apparatus 800 may perform an action of the access network device in the flow shown in FIG. 2.

The communications apparatus 800 includes: a processor 801, a transceiver 802, and a memory 803. The processor 801, the transceiver 802, and the memory 803 are connected to each other by using a bus 804.

The processor 801 invokes program code stored in the memory 803, and may perform the following steps:

receiving a first uplink authorization instruction from an access network device through the transceiver 802, where the first uplink authorization instruction is used to instruct the terminal to send uplink data of a second subframe quantity; and the second subframe quantity is a subframe quantity that enables the waiting duration corresponding to transmitting the uplink data by the terminal to be less than or equal to a threshold and that is determined within a preset subframe quantity value range by the access network device when waiting duration corresponding to transmitting uplink data of a first subframe quantity by the terminal is greater than the threshold; and sending uplink data of the second subframe quantity through the transceiver 802.

Optionally, the threshold is 0.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A data transmission method, comprising:

obtaining, by an access network device, a waiting duration corresponding to transmitting uplink data of a first subframe quantity by a terminal, wherein the first subframe quantity corresponds to a first quantity of one or more subframes with a greatest scheduling efficiency within a preset value range of a quantity of subframes when the access network device schedules the terminal to transmit the uplink data, wherein scheduling efficiency is determined based on a ratio of a quantity of bits of data transmitted during a time period comprising the waiting duration and a length of the time period, and wherein the waiting duration is a duration that exists after the terminal transmits the uplink data and that extends from a time at which the terminal switches to a listening state to a time at which the terminal detects an uplink authorization instruction;

determining that the waiting duration is greater than a threshold;

in response to determining that the waiting duration is greater than the threshold, determining, by the access network device within the preset value range of the quantity of subframes, a second subframe quantity that enables the waiting duration to be less than or equal to the threshold, the second subframe quantity corresponding to a second quantity of one or more subframes; and sending, by the access network device, a first uplink authorization instruction to the terminal, wherein the first uplink authorization instruction is used to instruct the terminal to send uplink data of the second subframe quantity.

2. The method according to claim 1, wherein the method further comprises:
in response to determining that the waiting duration is less than or equal to the threshold, sending, by the access network device, a second uplink authorization instruction to the terminal, wherein the second uplink authorization instruction is used to instruct the terminal to send the uplink data of the first subframe quantity.

3. The method according to claim 1, wherein the method further comprises:
in response to determining that the second subframe quantity does not exist within the preset value range of the quantity of subframes, sending, by the access network device, a second uplink authorization instruction to the terminal, wherein the second uplink authorization instruction is used to instruct the terminal to send the uplink data of the first subframe quantity.

4. The method according to claim 1, wherein the determining the second subframe quantity comprises:
for a particular subframe quantity within the preset value range of the quantity of subframes, in response to determining, by the access network device, that a waiting duration corresponding to transmitting uplink data of the particular subframe quantity by the terminal is less than or equal to the threshold, determining the particular subframe quantity as the second subframe quantity.

5. The method according to claim 1, wherein the threshold is 0, and wherein the second subframe quantity enables the waiting duration to be equal to 0.

6. A data transmission method, comprising:
receiving, by a terminal, a first uplink authorization instruction from an access network device, wherein the first uplink authorization instruction is used to instruct the terminal to send uplink data of a second subframe quantity, the second subframe quantity corresponding to a second quantity of one or more subframes, and wherein the second subframe quantity enables a waiting duration corresponding to transmitting the uplink data by the terminal to be less than or equal to a threshold and that is determined within a preset value range of a quantity of subframes by the access network device when a waiting duration corresponding to transmitting uplink data of a first subframe quantity by the terminal is greater than the threshold, the first subframe quantity corresponding to a first quantity of one or more subframes; and sending, by the terminal, the uplink data of the second subframe quantity.

7. The method according to claim 6, wherein the threshold is 0, and wherein the second subframe quantity enables the waiting duration to be equal to 0.

8. A communications apparatus, comprising:
at least one processor;
one or more memories coupled to the at least one processor and storing programming instructions for execution by the at least one processor to:

obtain a waiting duration corresponding to transmitting uplink data of a first subframe quantity by a terminal, wherein the first subframe quantity corresponds to a first quantity of one or more subframes with a greatest scheduling efficiency within a preset value range of a quantity of subframes when the terminal is scheduled to transmit the uplink data, wherein scheduling efficiency is determined based on (1) a ratio of a quantity of bits of data transmitted during a time period comprising the waiting duration and (2) a length of the time period, and wherein the waiting duration is a duration that exists after the terminal transmits the uplink data and that extends from a time at which the terminal switches to a listening state to a time at which the terminal detects an uplink authorization instruction;
determine that the waiting duration is greater than a threshold;
in response to determining that the waiting duration is greater than the threshold, determine a second subframe quantity that is within the preset value range of the quantity of subframes and that enables the waiting duration to be less than or equal to the threshold, the second subframe quantity corresponding to a second quantity of one or more subframes; and
send a first uplink authorization instruction to the terminal, wherein the first uplink authorization instruction is used to instruct the terminal to send uplink data of the second subframe quantity.

9. The apparatus according to claim 8, wherein the programming instructions are for execution by the at least one processor to:
in response to determining that the waiting duration is less than or equal to the threshold, send a second uplink authorization instruction to the terminal, wherein the second uplink authorization instruction is used to instruct the terminal to send the uplink data of the first subframe quantity.

10. The apparatus according to claim 8, wherein the programming instructions are for execution by the at least one processor to:
in response to determining that the second subframe quantity does not exist within the preset value range of the quantity of subframes, send a second uplink authorization instruction to the terminal, wherein the second uplink authorization instruction is used to instruct the terminal to send the uplink data of the first subframe quantity.

11. The apparatus according to claim 8, wherein the programming instructions are for execution by the at least one processor to:
for a particular subframe quantity within the preset value range of the quantity of subframes, in response to determining that a waiting duration corresponding to transmitting the uplink data of the particular subframe quantity by the terminal is less than or equal to the threshold, determine the particular subframe quantity as the second subframe quantity.

12. The apparatus according to claim 8, wherein the threshold is 0, and wherein the second subframe quantity enables the waiting duration to be equal to 0.

* * * * *